(No Model.) 4 Sheets—Sheet 2.

H. P. TOBEY & G. B. THAYER.
ORE CONCENTRATOR.

No. 326,808. Patented Sept. 22, 1885.

WITNESSES
INVENTORS (No Model.) 4 Sheets—Sheet 3.

H. P. TOBEY & G. B. THAYER.
ORE CONCENTRATOR.

No. 326,808. Patented Sept. 22, 1885.

WITNESSES
H. B. Applewhait,
Daniel Clark

INVENTORS
Horace P. Tobey
George B. Thayer
per attys.
A H Evans & Co (No Model.) 4 Sheets—Sheet 4.
H. P. TOBEY & G. B. THAYER.
ORE CONCENTRATOR.
No. 326,808. Patented Sept. 22, 1885.
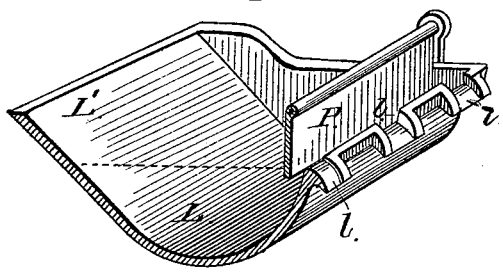
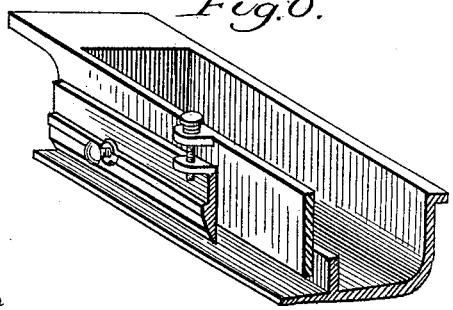
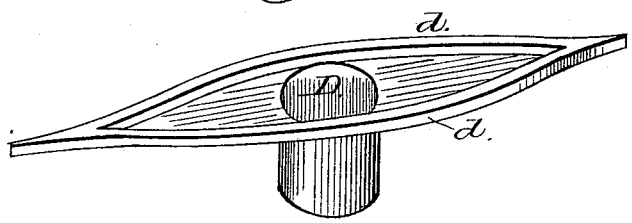
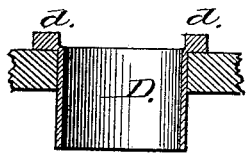
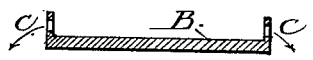
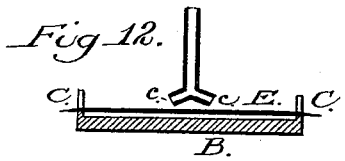
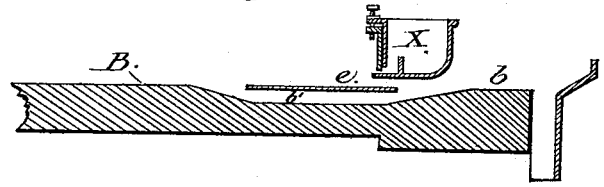
WITNESSES
T. W. Fowler
H. B. Applewhaite
INVENTOR
Horace P. Tobey.
Geo. B. Thayer.
by A. H. Evans & Co
Attorneys

UNITED STATES PATENT OFFICE.

HORACE P. TOBEY, OF WAREHAM, AND GEORGE BURDER THAYER, OF BOSTON, MASSACHUSETTS, ASSIGNORS TO THE GOLDEN GATE CONCENTRATOR COMPANY, OF BOSTON, MASS.

ORE-CONCENTRATOR.

SPECIFICATION forming part of Letters Patent No. 326,808, dated September 22, 1885.

Application filed February 23, 1884. (No model.)

*To all whom it may concern:*

Be it known that we, HORACE P. TOBEY, of Wareham, in the county of Plymouth and Commonwealth of Massachusetts, and GEORGE B. THAYER, of Boston, in the county of Suffolk and Commonwealth aforesaid, have invented certain new and useful Improvements in Ore-Concentrators; and we do hereby declare the following to be a full, clear, and exact description of our invention, reference being had to the accompanying drawings, which form part of this specification, in which—

Figure 1 is a longitudinal vertical section of a concentrating-machine embodying our improvements. Fig. 2 is a plan view of the same with the globe-valves of Figs. 1 and 3 removed. Fig. 3 is a view of the right-hand end of Figs. 1 and 2. Fig. 4 is a transverse section of the same, showing the exhaust-pipe partly in elevation and partly in section. Fig. 5 is a partial transverse section on line $x\ x$ of Fig. 1, showing details of part of the stirring mechanism. Fig. 6 shows a series of distributers disposed between a stamp-battery and a concentrator. Fig. 7 is a sectional view of our distributer with the agitators, &c., removed. Fig. 8 is a sectional view of our water-vessel. Figs. 9 to 13 illustrate modified forms of portions of our invention.

Our invention relates to new and valuable mechanism for concentration, to certain improved devices for feeding the ore and wash-water to the concentrator for saving floating mineral, and for promoting the prompt separation of the mineral and gangue into distinct layers or strata upon the ore-bed.

As an incidental advantage, our concentrator performs the office of a draining-table in a perfect manner, and with little loss of fine mineral. It is also an excellent amalgamator, and our ore-distributing devices, beside securing a uniform delivery of the pulp upon all parts of the concentrator, are especially valuable in the treatment of free-milling ores, from their efficiency in brightening rusty gold, &c., and saving amalgam and mercury. We have discovered that, by the preliminary removal from the ore of all of its lighter and more easily separated gangue before subjecting it to the washing of a stream of water, we can greatly add to the rapidity of this washing, which is necessary to the removal of the heavier portion of the gangue, and that we can effect this washing with much less water and less waste of valuable mineral than is attendant upon the ordinary washing of the ore without any preliminary separation of its lighter gangue. In concentrating ores by our machine the ore-bed is made in two parts.

The portion A of our ore-bed, which we call the "settling-compartment," is preferably made nearly horizontal in longitudinal direction, while the part B, which we call the "washing-compartment," is inclined upward from its junction with the part A, and the amount of inclination of the part B can be varied to suit the requirements of different ores. Both A and B have the usual upright sides for preventing the lateral escape of the ore and water. The feed end of the part A is closed for the same purpose, and the upper end of B is left open for the passage of the clean mineral.

By suitable mechanism a shaking motion is communicated to the ore-bed, whereby the heavier metallic portions of the ore, which are fed upon the settling-compartment at or near the point $a$, are settled down upon said ore-bed in the usual manner, and at the same time the ore is made to travel from the point $a$ toward the head of the machine over or with the surface of the ore-bed by any of the well-known means heretofore used for this purpose. Figs. 1, 2, and 3 show the combination we prefer to use to enforce this traveling and settling of the ore, which is substantially the mechanism patented to us by United States Letters Patent No. 287,195, and dated October 23, 1883, and fully described therein, to which description reference is made for a full explanation of all parts of Figs. 1, 2, and 3 not herein described. Instead of the combination shown in Figs. 1, 2, and 3 any other of the well-known equivalents for causing the combined settling and travel of the ore above described may be used, such as cams, springs, elliptic gears, &c.

We have described our settling-compartment as being preferably made nearly horizontal; but it is obvious that this is not an essential condition, but only a matter of convenience, the essential condition to the proper working of our machine being that the water fed in with the pulp may find its level in this compartment, so as to allow the mineral particles suspended in the water to be precipitated therefrom before the latter is withdrawn. This part of our ore-bed may therefore be inclined downward to any reasonable extent from its junction with the washing-compartment, and may even have the same inclinations as the latter. In such case, however, the upright sides and closed end of the settling-compartment should be extended upward far enough to allow the maintenance of the water-level, as before explained.

The operation of our concentrator is as follows: The ore-bed being arranged substantially as shown in Figs. 1, 2, and 3, and having the proper shaking movement communicated to it, as before explained, the comminuted ore is by any suitable means continuously fed upon the bed at or near the end $a$, and slowly travels over the surface of the ore-bed toward the upper end or head $b$ thereof, the shaking motion compelling the heavier particles—that is the valuable mineral particles—to settle upon the ore-bed, while the waste water and the light and heavy gangue arrange themselves to form the upper strata according to their respective specific gravities. At the point C near the junction of A the settling-compartment with the washing-compartment B we remove the upper or lighter parts of the stratum of gangue by any suitable means such as below described, while the remaining portion of the ore, including all the valuable mineral with a portion of the gangue passes on to the washing-compartment B, where the mineral is freed from all or any desired part of the residual gangue by a current of water flowing down over this part of the ore-bed in the usual manner. The proper inclination of the washing-compartment being obtained by means of the worm and worm-gear, &c., shown and described in United States Letters Patent No. 287,195 before referred to. Thus we effect a preliminary or intentionally imperfect separation upon the part A and the final or perfect separation on part B.

For the removal of the superfluous gangue and water at the point C without incurring loss of valuable mineral, we have tried various means with good success. In case the ore-bed is narrow the construction shown in Fig. 11 may be used with advantage. In this case we reduce the height of the upright sides of the ore-bed at the point C or make openings therein through the said sides, to allow any desired portion of the upper stratum to overflow.

Figs. 9 and 10 show a manner of applying this overflow to wide trays, in which openings of discharge D are made through the bed of the tray, around which openings are formed the raised rims $d$, to prevent the escape of the mineral-bearing lower stratum.

Fig. 12 shows another construction by which a more thorough removal is accomplished by a jet or jets, $c$, of water, discharging transversely across the ore-bed at the point C, so as to remove the upper parts of the stratum of pulp coming from the lower end of the ore-bed as well as the wash-water and gangue coming down from the upper part of the ore-bed B.

When jets of water are used for the removal of the gangue and other refuse matter at the point C, it is better to use the plate or shield E below described to avoid any disturbance of the lower or mineral stratum and consequent loss of the mineral. When the ore-bed is of considerable width, these water-jets may be used in combination with the openings D, (shown in Figs. 9 and 10,) or the gangue and waste water may be driven from the middle of the ore-bed over each side, additional reenforcing jets being employed, if necessary, to insure the prompt removal of said gangue, &c.

Figure 1:
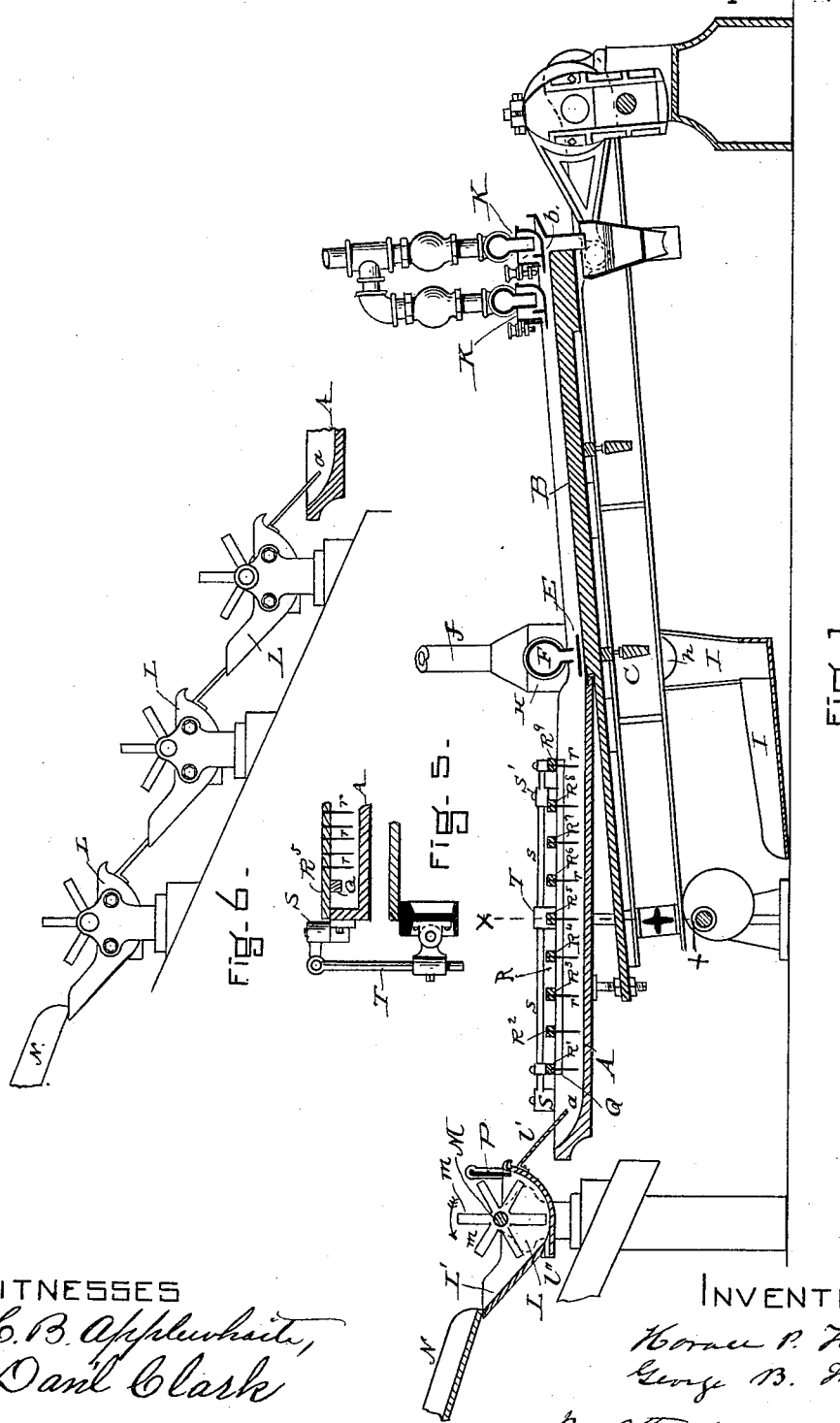

We have shown in Figs. 1, 2, 3, and 4 the form of apparatus we prefer for the removal of the gangue and water. This consists of two parts, viz: a protecting-plate, E, and a discharging-tube, F, both extending transversely across the table at or near the lower end of the washing-compartment. The plate E is fixed in place so as to be parallel with the surface of the ore-bed beneath it, and its height above said surface should be made adjustable to suit the requirements of different ores. In Fig. 1, in which the ore-bed is in the form of a longitudinally-reciprocating tray, the plate E may either be attached to and move with the tray or be stationary.

Figure 2:
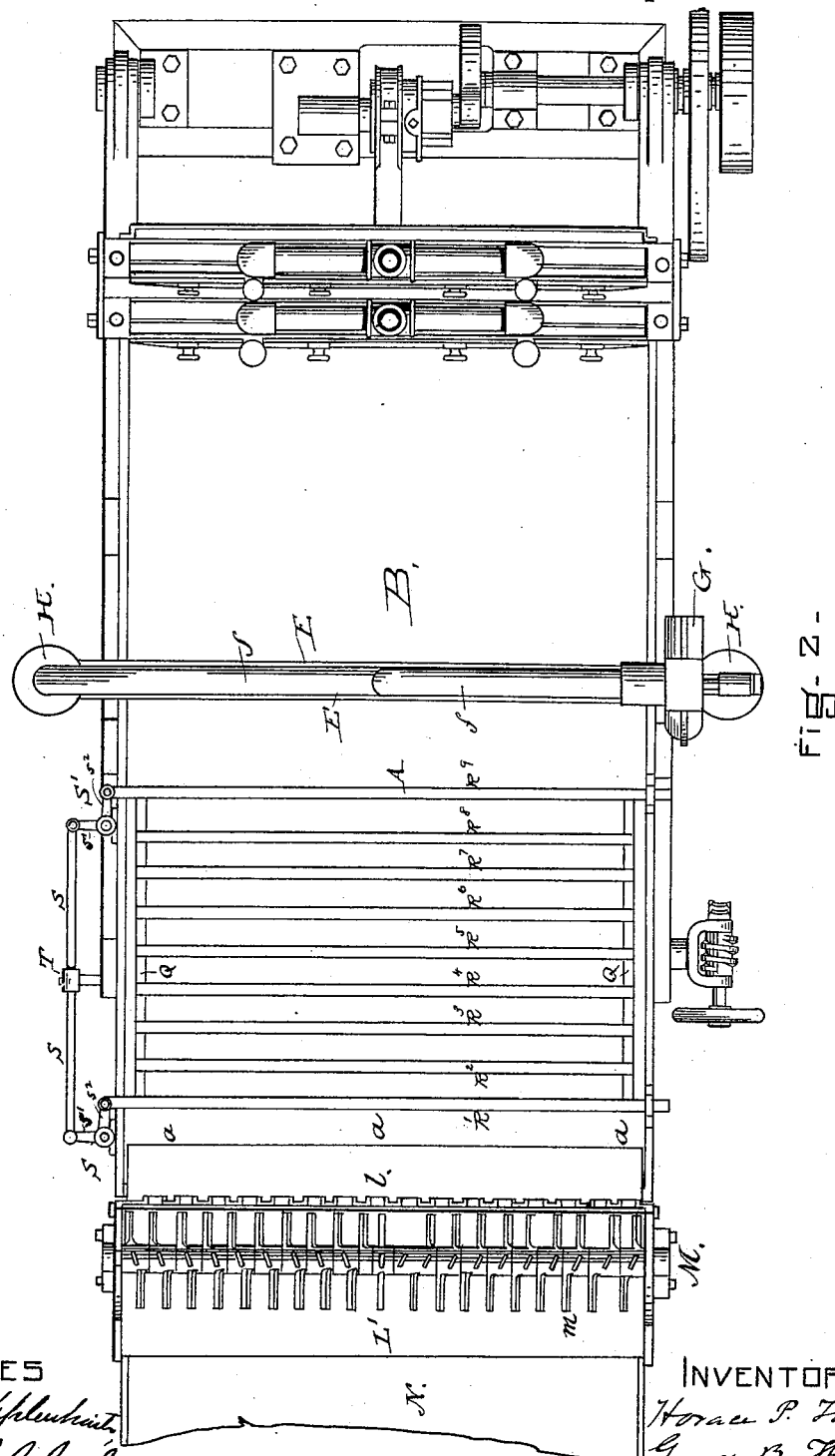
Figures 3, 4:
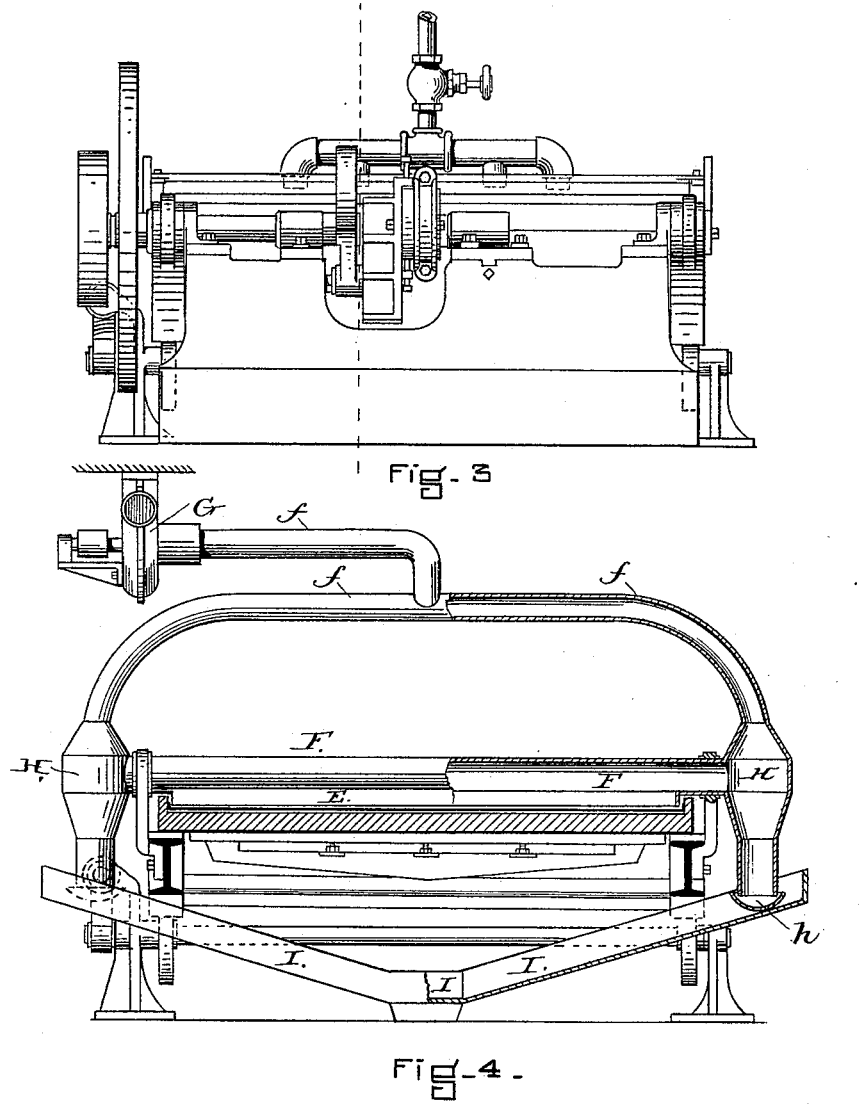

The office performed by the plate E is twofold—to effect an absolute division between the upper and lower strata of gangue, and to act as a shield to protect the lower strata of gangue and mineral from the disturbance, while from above we sluice off or remove by mechanical means the lighter parts of the gangue and waste water. The waste-discharge tube F is a pipe or series of pipes of any convenient form secured above the plate E, having along its lower side, next to the plate, an opening or openings, through which a continuous induction of gangue and water from the surface of the plate takes place continuously while the machine is in operation, the lifting force required for this purpose being provided by maintaining a constant rarefaction of the air within said tube F by any suitable means—such as an exhaust fan or pump connected with the outer end of said tube by a suitable system of pipes. Figs. 2 and 4 show an exhaust-fan, G, with its system of pipes adapted for this purpose to a wide ore-bed, the discharge of gangue, &c., taking place from both sides. In case of a narrow table the entire discharge may be carried to one side of the machine. F is the discharge-tube. H are settling-chambers of large area, reducing the velocity of the current of mingled air, water, and gangue, and allowing the air to separate from the latter. The air passes upward through the fan by the pipes $f f f$, while the water and gangue fall into the lower parts of the chambers H and pass out therefrom into the waste-sluices I over the rims of the cups $h$, which form water seals to prevent the induction of air at these parts of the system of pipes.

We contemplate using, instead of the above-described apparatus, a centrifugal or other form of pump, or any other equivalent means.

The use of the plate E, in connection with the tube F, is not absolutely required. If the induction opening or openings of the tube F are placed at a sufficient distance above the surface of the ore-bed, there will be no disturbance of the lower mineral stratum, even when no plate is used.

We are aware that concentration has been effected heretofore by submitting the ore to successive washings, each successive treatment giving a product more free from gangue than the preceding one. Our machine, however, differs from the above principally in the fact that the ore before it is washed is first subjected to a settling operation, separating the mineral and the gangue into distinct layers. This preliminary operation, besides allowing the finer particles to settle from the water in which they are suspended, puts the mineral into a stratified form, so that the final operation of washing may be effected without disturbing the stratified form. It will be noted, also, that these two operations in our machine are continuous, and that the mineral particles, once settled upon the surface of the settling-compartment, pass on to the washing-compartment without any disturbance of their relative positions, and without any remingling with the gangue.

It is also obvious, as an important feature of our machine, that during the passage of the mineral particles from one compartment to the other, and during their passage over both compartments, they are kept submerged below the surface of the water, and are thus kept out of contact with air and protected from the danger of loss through the floating away of fine mineral, which is always incurred when fine mineral is exposed, even for an instant, to the air.

In the operation of crushing ores, especially where fine crushing has to be resorted to in order to free the mineral from the gangue rock, a considerable part of the mineral portions of the ore, owing to their more brittle or friable nature, often become reduced to a very fine dust.

The devices illustrated in Fig. 13 are intended to obviate this fruitful source of loss, and consist, mainly, in a protecting-apron, $e$, which receives the first impulse of the water as it issues from the water-vessel X. This apron $e$ is placed transversely across the tray near the upper end of the washing-compartment, somewhat above its surface, so as to leave a space under it for the passage of the mineral; and we prefer, in order to avoid giving any fall to the water, as would be the case if the surface of the tray were continued in a straight line, to make a depression or basin, $b'$, in the surface of the tray at the point where the apron is located, by means of which we are enabled to have the upper surface of the apron nearly or quite as low as, or even lower, than the general line of the upper surface of the washing-compartment, and thus at all times submerged in water. To prevent the escape of the water over the head $b$ of the tray from the bottom of the depression $b'$, the surface rises as it is continued toward the head by an easy incline, the head of the tray being a little above the general line of the surface of the washing-compartment, which should join the bottom of the basin or depression by an easy curve to prevent any agitation of the mineral.

The protecting-apron $e$, arranged as above described, may be used in connection with a water-vessel of any of the usual or other convenient forms; but we prefer to use the form of water-vessel shown in Fig. 8.

Our improved form of pulp-distributer is shown in Figs. 1, 2, and 6 at L, and in detail in Fig. 7. This consists of a semi-cylindrical shaped hopper with closed ends, the rear side being extended backward to form an apron, L', upon which the pulp is delivered from the crushing apparatus through the sluice shown at N. A shaft, M, is supported in bearings concentrically with the cylindrical part of the hopper and carries a large number of agitator-arms, $m$, fixed upon the shaft M. We prefer to make along the front or discharge side of the distributer a series of depressions, $l l l$, to facilitate the uniform discharge of the mingled pulp and water, and underneath to attach the delivery-apron $l'$, over which the ore and mingled water flow onto the concentrator. One or more outlets, $l''$, are made in the bottom of the distributer, which are to be kept closed while running.

The operation of this distributer is as follows: While the concentrator is in operation, the stirrer or agitator, consisting of the shaft M and the arms thereto attached, is rotated in the direction of the arrow, (see Fig. 1,) and the ore, with a sufficient quantity of water, is fed continuously upon the rear apron, L'. The motion of the stirrer or agitator M keeps the particles of the ore in suspension in the water, and there is a continuous and even flow of mingled ore and water through the depressions $l l$ onto the apron $l'$, and thence to the concentrator. When for any reason it is necessary or more convenient to deliver the pulp upon the rear apron, L', from a narrow sluice, the delivery is made at the middle part of the apron L', and by slightly feathering the agitator-arms in opposite directions on each side of the middle line of the distributer, as shown in Fig. 2, an even feed is secured along its entire length.

Many ores, especially where dry-crushing is used, are exceedingly difficult to wet down thoroughly preparatory to concentration. A light scum, which is rich in mineral and floats on water, is formed on wetting these ores, and its escape would entail considerable loss. In our form of distributer we avoid this loss in part by the curtain P, which is suspended across the front end of the hopper, just a little in advance of the agitator-arms. This curtain has its lower edge somewhat below the level of the depressions $l$ $l$ within the hopper, and is partly immersed at all times in water, so that the scum formed cannot escape until it is wetted down by the action of the agitator-arms.

When working ores that have undergone a process of amalgamation for saving the free mineral, our form of distributer is an excellent device for saving the amalgam and mercury lost from the batteries and aprons, since, in consequence of their great specific gravity, they settle into the lower part of the distributer, and may be drawn off from time to time through the outlets $l''$ $l''$ above mentioned.

We propose to use a series of these distributers between the batteries and the concentrator or amalgamators, and to brighten "rusty" metal or mineral, and to save lost amalgam and mercury, as before described. Such a series of distributers, made wholly or partly of copper and coated with mercury, so as to form amalgamating surfaces of large area, as shown in Fig. 6, may be used either in connection with the usual apron-plates, or as a substitute for them, each one of the series discharging into the one next below, and the last one upon the concentrator, as before explained.

If desired, the amalgamating surface formed by one or a series of distributers arranged as herein shown, may be increased by making either the entire surface of the ore-bed of the concentrator, or simply that of the horizontal part thereof, A, of copper coated with mercury in the usual way.

The devices Q, R, $r$, S, S', and T, (shown in Figs. 1, 2, and 5 as applied to the part A of a reciprocating tray,) may be applied either to the part A or the part B of the ore-bed, or to both of them, and have for their object to promote the prompt separation of the mineral and gangue into distinct layers, serving, also, when applied to the inclined part B of the ore-bed, to greatly facilitate the final washing down of the gangue, allowing this part of our work to be done with a minimum quantity of water, and consequently a minimum loss of fine mineral.

The above-mentioned devices consist in a frame-work, R, carrying stirring-pins, $r$, placed a suitable distance above the surface of the ore-bed. This frame-work consists of the longitudinal pieces Q Q, to which are secured the cross-pieces R' R² R³, &c., from the lower side of which project downward the stirring-pins $r$ $r$. A transverse reciprocating motion is communicated to this frame-work carrying the stirring-pins by means of the bell-crank levers S S', which are pivoted to any convenient part of the tray. One arm of each of the levers S S' is pivoted to the extreme cross-pieces R' R³, while the other arms are joined by a connecting-link, $s$, which is held stationary by being suitably secured to any convenient part of the stationary frame-work of the machine or to the adjustable pivoted arm T (see Fig. 5) secured thereto.

Since the pivots of the bell-crank levers S and S' are attached to and partake of the longitudinal reciprocating movements of the tray, while the outer arms, $s'$ $s'$, of the levers are held stationary by the connecting-link $s$, it is obvious that while the tray is describing its longitudinal movements the inner arms, $s^2$ $s^2$, and the frame-work Q Q R, attached to said arms $s^2$ $s^2$, must move in a direction transverse to the motion of the tray itself; and it will be noticed as a peculiarity distinguishing our combination from all similar ones heretofore used, that while our pins are moving transversely through the body of the ore resting on the tray, they partake of the longitudinal motions of the tray, so that their motions relative to the ore-particles are simply transverse ones, and are not complicated by the longitudinal movements of the tray.

We prefer to gradually increase the distance of the lower ends of the successive series of stirring-pins from the surface of the table, commencing with those upon the piece R' which is nearest the point at which the ore is delivered upon the ore-bed. The use of this device, while it increases the capacity of the concentrator for all ores, is especially valuable in treating ores which carry fine clay or other light earthy matters, as by using an excess of water from the distributer the greater part of the clay is kept in suspension, and is floated away with the waste water, and herein the usual excess of water, when concentrators are running behind a stamp-mill, which is a hinderance to concentration and must be got rid of, in our machine is of positive benefit. It is thus seen that the part A of our concentrator performs the office of a draining-table in a most efficient manner, since the distance between the point at which the water is withdrawn from the ore-bed and point where the pulp is delivered allows the heavier fine mineral particles to settle out of the water before the latter is withdrawn. It is obvious that this part A of the ore-bed may be used as a draining-table simply by raising the plate E, so as to allow all the gangue to pass under it, while the water is removed from above it by the tube F above described.

Having thus described our invention, what we claim as new, and desire to secure by Letters Patent, is—

1. In an ore-concentrator, an ore bed or tray consisting of an independent settling-compartment, free or nearly free from water-current, and an inclined washing-compartment continuous therewith, a vessel to supply water to the washing-compartment, and mechanism, substantially as described, to shake the said compartments to effect the stratification of the ore and its travel in the said compartments, combined with means, substantially as described, for removing the gangue and water at or near the junction of its settling and washing compartments, as and for the purpose set forth.

2. In an ore-concentrator, an ore bed or tray consisting of a settling-compartment, free or nearly free from water-current, and a connected inclined washing-compartment, a vessel to supply water to the washing-compartment, and a shaking mechanism, substantially as described, to effect the stratification and travel of the ore on the said ore bed or tray, in combination with a protecting-plate, exhaust-tube F, and connected system of pipes, to operate substantially as described.

3. In an ore-concentrator, an ore bed or tray and protecting-plate therein parallel to said ore bed or tray, combined with a tube, F, and with means, substantially as described, to rarefy the air in the said tube, as and for the purpose set forth.

4. The concentrating bed or tray composed of the communicating, settling, and washing compartments, combined with the protecting-plate set at the junction of the said compartments, to operate substantially as described.

5. In an ore-concentrator, the ore bed or tray and the hollow open ore-distributing vessel or hopper having its delivery edge arranged transversely with relation to said ore bed or tray and parallel to and lower than its receiving-edge, combined with a stirrer or agitator arranged parallel to the said delivery edge of said hopper, as and for the purpose set forth.

6. In an ore-concentrator, the ore bed or tray and the hollow open ore-distributing vessel or hopper having its delivery-edge arranged transversely with relation to said ore bed or tray and parallel to and lower than its receiving-edge, combined with a stirrer or agitator arranged parallel to the said delivery-edge of said hopper, said vessel or hopper having an opening, $l''$, in its bottom for the removal of waste mercury and amalgam, substantially as described.

7. In an ore-concentrator, an ore bed or tray and the ore-distributing vessel or hopper arranged transversely with relation to the said bed or tray, and the stirrer or agitator therein, having its axis arranged transversely to the said ore bed or tray, combined with the curtain arranged at the delivery-edge of the said vessel, and having its lower edge extended below the said delivery-edge and into the vessel, as and for the purpose set forth.

8. The settling-compartment A and the compartment B in communication therewith, combined with means, substantially as described, located within said settling-compartment at or near its junction with the compartment B, to remove the superfluous gangue and water from the said compartments, substantially as set forth.

9. In an ore-concentrator, a reciprocating ore bed or tray provided with a depressed portion, $b'$, and a vessel to discharge water thereon, combined with a protecting-apron, $e$, interposed between the outlets of the said vessel and the bottom of the said depressed portion of the ore bed or tray, to operate substantially as described.

10. The reciprocating ore bed or tray of an ore-concentrator and the frame carrying the series of stirring-pins attached to and partaking of the longitudinal motion of said ore bed or tray, combined with means, substantially as described, for causing said frame carrying the pins to reciprocate in a direction transverse to that of the movement of said ore bed or tray, as and for the purpose set forth.

HORACE P. TOBEY.
GEORGE BURDER THAYER.

Witnesses:
MOORFIELD STOREY,
HENRY LUNT.